Feb. 20, 1934.  W. A. GIBSON  1,947,468
RETARDING DEVICE FOR PARACHUTES
Filed June 3, 1932
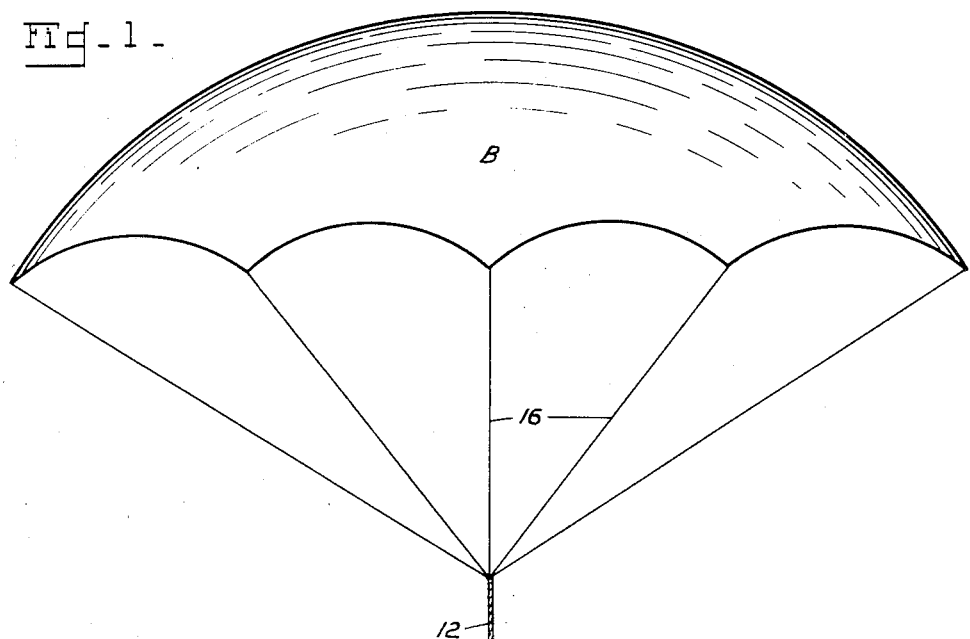
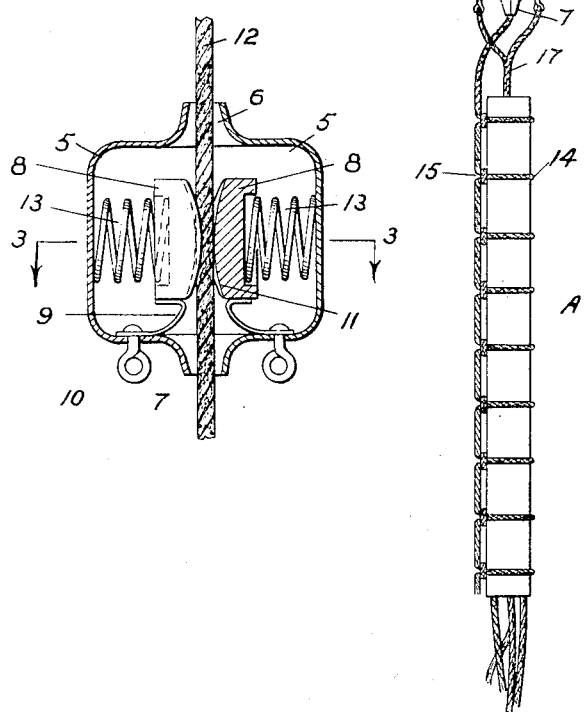
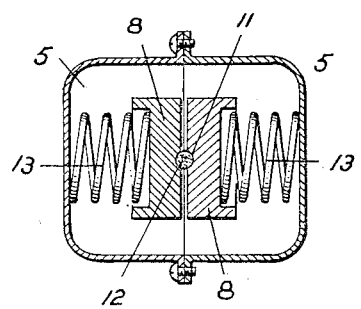
Inventor
William A. Gibson
W. N. Roach
Attorney Patented Feb. 20, 1934

1,947,468

UNITED STATES PATENT OFFICE 1,947,468

RETARDING DEVICE FOR PARACHUTES

William A. Gibson, Succasunna, N. J.

Application June 3, 1932. Serial No. 615,178

3 Claims. (Cl. 244—21)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a retarding device for parachutes.

When a parachute and a body to be supported thereby fall through a great distance before the parachute is opened, the shock occasioned by the sudden retardation is frequently sufficient to cause the shrouds or the fabric of the parachute to give way.

The purpose of the present invention is to provide a gradual retardation of the parachute before it is released. This is accomplished in a novel manner by means of a pilot parachute connected to the main parachute by a cord of appreciable length available to tie the main parachute in a folded unit and pulled through a friction device carried by the main parachute.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a view in elevation showing the pilot parachute in opened position preparatory to retarding and releasing the main parachute.

Fig. 2 is a vertical sectional view of the friction unit.

Fig. 3 is a detail sectional view taken on the line 3—3 of Fig. 2.

Referring to the drawing by characters of reference, there is shown a main parachute A, a pilot parachute B and an interposed friction device C.

The friction device consists of a casing conveniently formed of two sections 5—5 secured together in any suitable manner and having vertically aligned apertures 6 and 7. Within the casing are a pair of friction blocks 8—8, each supported by a flat spring 9 secured by means of an eye bolt 10 disposed externally of the casing and projecting through the casing and the spring. The inner faces of the blocks 8 are each formed with a groove 11, the two grooves being in alignment with the apertures 6 and 7 and cooperating to receive a cord or cable 12. The blocks 8 are forced together to frictionally confine the cord 12 by means of a pair of coil springs 13—13, each disposed between one of the blocks and a side wall of the casing.

The cord 12 is of appreciable length, from fifteen to twenty feet, and serves to tie the main parachute A in folded form. It embraces the folded parachute in a series of loops 14 with a slip knot 15 at each loop. The upper end of the cord after being passed through the friction device is attached to the shrouds 16 of the pilot parachute.

The friction device is attached to the main parachute by means of cords 17—17 each secured to one of the eye-bolts 10.

In operation when the two parachutes are released, the pilot parachute will be immediately opened and its retardation will cause the cord 12 to be pulled through the friction device secured to the main parachute and thereby gradually reduce the velocity of the main parachute and the object that it carries. At the same time the cord is being untied from the folded main parachute, finally releasing it and enabling it to open.

I claim.

1. In combination with a main parachute and a pilot parachute, a friction device carried by the main parachute and including an apertured casing, flexibly mounted opposed blocks in the casing, springs normally urging the blocks together, and a cord attached to the pilot parachute and passing through the apertured casing, said cord releasably holding the main parachute in folded position.

2. In combination with a main parachute and a pilot parachute, a friction device carried by the main parachute and including an apertured casing, flexibly mounted opposed blocks in the casing, springs normally urging the blocks together, and a cord attached to the pilot parachute and passing through the apertured casing.

3. In combination with a main parachute and a pilot parachute, a friction unit carried by the main parachute, and a cord attached to the pilot parachute and passing through the friction unit, said cord releasably holding the main parachute in folded position.

WILLIAM A. GIBSON.